(12) United States Patent
Kirshtein

(10) Patent No.: US 6,265,951 B1
(45) Date of Patent: Jul. 24, 2001

(54) METHOD AND APPARATUS FOR EQUALIZING CHANNEL CHARACTERISTICS IN A COMPUTER EXTENSION SYSTEM

(75) Inventor: Philip M. Kirshtein, New Market, AL (US)

(73) Assignee: Cybex Computer Products Corporation, Huntsville, AL (US)

( * ) Notice: Subject to any disclaimer, the term of this patent is extended or adjusted under 35 U.S.C. 154(b) by 0 days.

(21) Appl. No.: 08/971,224

(22) Filed: Nov. 15, 1997

(51) Int. Cl.[7] .................................................. H03H 5/00
(52) U.S. Cl. ............................................ 333/28 R; 333/18
(58) Field of Search ................................. 333/28 R, 18; 375/233; 348/607

(56) References Cited

U.S. PATENT DOCUMENTS

| | | | |
|---|---|---|---|
| 3,763,317 | * 10/1973 | Coleman, Jr. et al. | 327/154 |
| 4,257,029 | 3/1981 | Stevens | 340/915 |
| 4,543,642 | 9/1985 | Hansen | 710/127 |
| 4,885,718 | 12/1989 | Asprey et al. | 710/101 |
| 4,987,572 | 1/1991 | Scott | 370/538 |
| 5,133,081 | 7/1992 | Mayo | 455/18 |
| 5,353,409 | 10/1994 | Asprey et al. | 395/296 |
| 5,457,784 | 10/1995 | Wells et al. | 710/9 |
| 5,504,540 | 4/1996 | Shatas | 348/844 |
| 5,587,824 | 12/1996 | Asprey | 359/154 |
| 5,602,595 | 2/1997 | Citta et al. | 348/495 |
| 5,615,393 | 3/1997 | Kikinis et al. | 710/67 |
| 5,621,734 | 4/1997 | Mann et al. | 709/227 |
| 5,815,109 | 9/1998 | Tan | 341/177 |
| 5,859,545 | 1/1999 | Thornblad | 326/90 |
| 5,870,395 | 2/1999 | Baran | 370/395 |
| 5,974,058 | 10/1999 | Burns et al. | 370/538 |
| 6,014,040 | 1/2000 | Tracy | 326/90 |

OTHER PUBLICATIONS

Universal Serial Bus Specification, Revision 1.0 Jan. 15, 1996.

* cited by examiner

*Primary Examiner*—Benny Lee
*Assistant Examiner*—Stephen E. Jones
(74) *Attorney, Agent, or Firm*—Nixon & Vanderhye P.C.

(57) ABSTRACT

An apparatus and method for equalizing the characteristics of a communication channel in a computer extension system. A time measurement system determines the delay time in a pair of wires connecting a computer at a first site to peripherals at a second site. The value of the delay time serves as control signal to select filters where the filters have inverse channel frequency characteristics.

11 Claims, 6 Drawing Sheets

METHOD AND APPARATUS FOR EQUALIZING CHANNEL CHARACTERISTICS IN A COMPUTER EXTENSION SYSTEM

FIELD OF THE INVENTION

This application relates to a computer extension system for connecting a computer at a first site to peripherals at a second site and, more specifically, to a method and apparatus for automatically equalizing channel characteristics.

BACKGROUND OF THE INVENTION

A personal computer is typically coupled to peripherals that serve as computer-user interfaces. Such peripherals may include a keyboard, a mouse, and a video monitor. Typically standard cables connecting each peripheral are around four feet long. Because of the characteristics of the connecting cables and their interfaces, the cables do not provide a reliable peripheral connection when they are much longer than twenty feet.

There are situations where it is desirable to separate the computer from the peripherals at distances much greater than allowed by typical standard peripheral cables. The apparatus to extend the distance between a computer and peripherals is called a computer extender or a computer extension system. One such system, PC-Extender Plus is available from Cybex Computer Products Corporation of Huntsville, Alabama. The PC-Extender Plus allows a keyboard, monitor, and mouse to be placed up to 600 feet away from the computer. An extender typically has two electronic boxes and several cables between the computer and the peripherals. As the demand for extenders increases, the need for more efficient use of cables has developed.

In existing extenders, standard coaxial cables, shielded cables, and unshielded cables may serve as communication channels. In addition, custom cables have been developed to provide an improved communication channel for extender systems. The cables connecting the computer to the peripherals may be confined in a binder or may be separate cables for each of the desired communication channels. Because distances between the computer and the peripherals vary from a few feet up to several hundred feet the frequency response of the cable connecting a first site from a second site has variations. These variations are available from the cable manufacture or may be observed using well-known measurement techniques. The variation in the frequency response as a function of cable length is known to those skilled in the art. If the length of a cable is known, a filter with inverse frequency characteristics can be placed in series with the cable thereby effectively canceling the frequency response impairment of the cable. The use of this inverse filter is referred to as equalizing the characteristics of the communications channel and the filter is called an equalizer. If the inverse filter is tuned adaptively it is referred to as an adaptive equalizer. Telephone line modems, such as a V.34 modem, have adaptive equalizers. The adaptive equalizers in modems are implemented using digital signal processors and they work well at the relatively low-data rates of a telephone line modem.

Existing extension systems typically require a plurality of communication channels. Three may be used for the video signals having red, green, and blue video signals. Other cables or wires are required for transferring peripheral information such as mouse data, mouse clock, keyboard data, keyboard clock and other information. In existing extensions each of the cables may be equalized by a manual selection of filters. While this does improve end-to-end frequency response, the manual selection method may require custom designs for each cable length and may require the efforts of a skilled technician during setup. If the extension system is moved or for some other reason the cable lengths are changed it may be necessary to readjust the equalizing filters.

Accordingly, it is the object of this invention to provide for more efficient and improved method for equalizing cable characteristics and at the same time reduce cost. In addition if equalization were automatic it would not require the use of a skilled technician and would reduce the time to install or move a computer extension system.

DESCRIPTION OF THE PREFERRED EMBODIMENT

Figure 1:
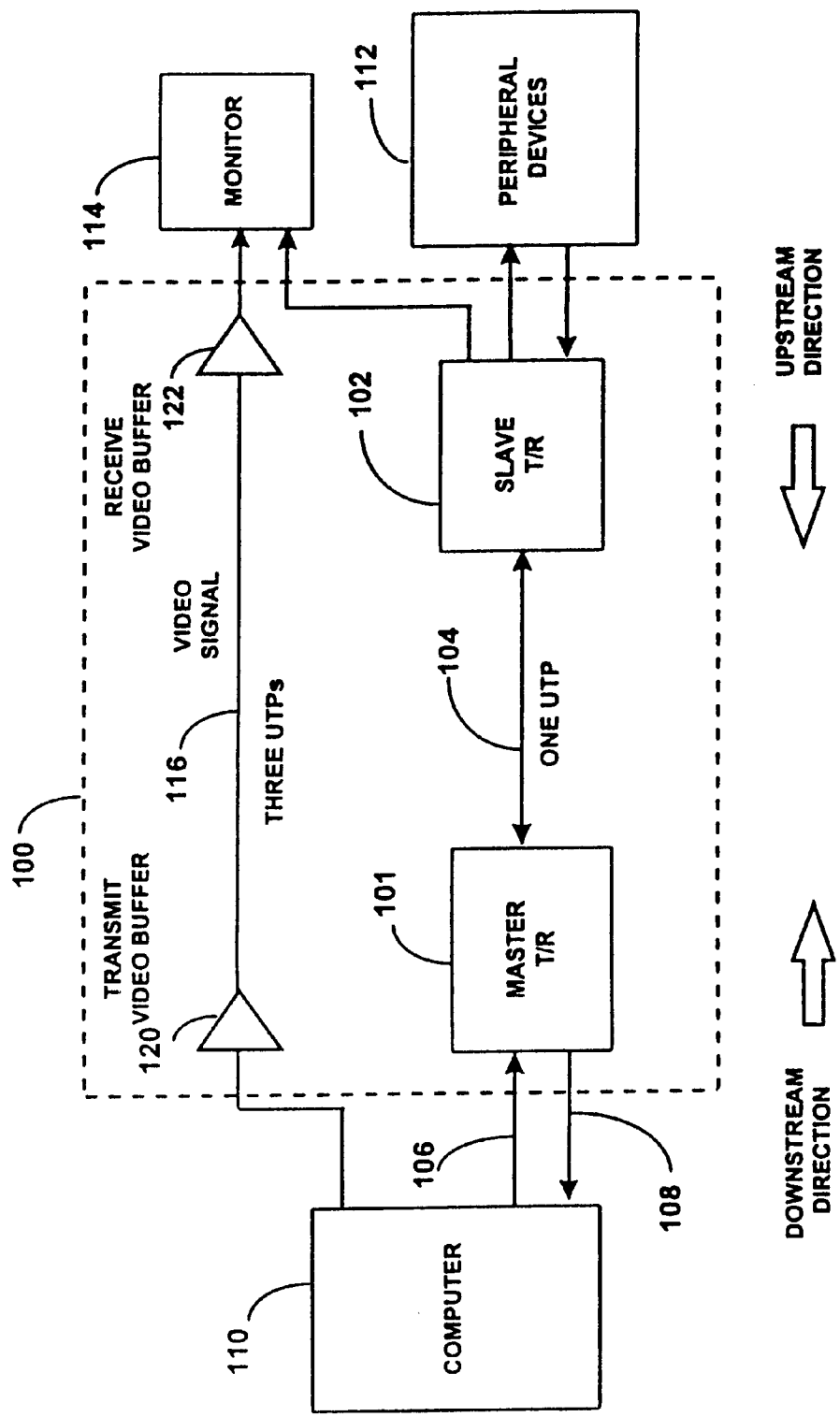
FIG. 1 is a block diagram illustrating a computer coupled to peripherals via an extension system in accordance with the present invention.

FIG. 1 illustrates an extension system 100 in accordance with the present invention. The extension system has a master transmitter and receiver ("T/R") 101 and a slave T/R 102 coupled by one unshielded twisted pair ("UTP") 104. To couple video between a computer 110 and a monitor 114, three UTPs, 116 are used to transfer red, green, and blue video signals. The peripheral devices 112 include at least a mouse and a keyboard. Information or data going from the computer 110 to the peripheral devices 112 is going in the downstream direction and information going from the peripherals to the computer is going in the upstream direction. The three UTPs 116 coupling the computer to the video monitor 114, typically would have a master video buffer 120 and a slave video buffer 122. These video buffers are located in the master T/R 101 and the slave T/R 102, but are shown as separate elements for clarity. Although UTPs are used to couple the master T/R 101 and the slave T/R 102 shielded pairs, coaxial cables, and other known cables could provide a communication channel and still be within the scope of the present invention. The one UTP 104 is also used to furnish DC power to the slave T/R 102 from the master T/R 101. A DC power supply located (not shown) in the master T/R is coupled to the one UTP using typical inductive coupling. The slave T/R 102 has an inductive coupling for receiving the DC power. Those persons skilled in the art could determine the levels of voltages required to provide the necessary DC voltage levels at each end of the power providing arrangement. Further, common mode signaling is provided by the one UTP 104 for transferring a video horizontal sync signal.

Although the three UTPs 116 serve as a video channel for video signals from the computer as shown in FIG. 1, other arrangements may be used to transfer video signals. The typical video signals from the computer are red (R), green (G) and blue (B) as described in U.S. Pat. No. 5,504,540 which is incorporated herein by reference. The other arrangements may include, for example a coaxial cable or a custom designed cable which may serve as video channels for the video signals from the computer. As will be seen in an embodiment of the present invention horizontal sync signals and vertical sync signals may be sent using the one unshielded twisted pair 104 while R, G, and B are transferred downstream by separate video channels. The present invention is capable of transferring a plurality of peripheral information in both the downstream and the upstream directions.

Figure 2:
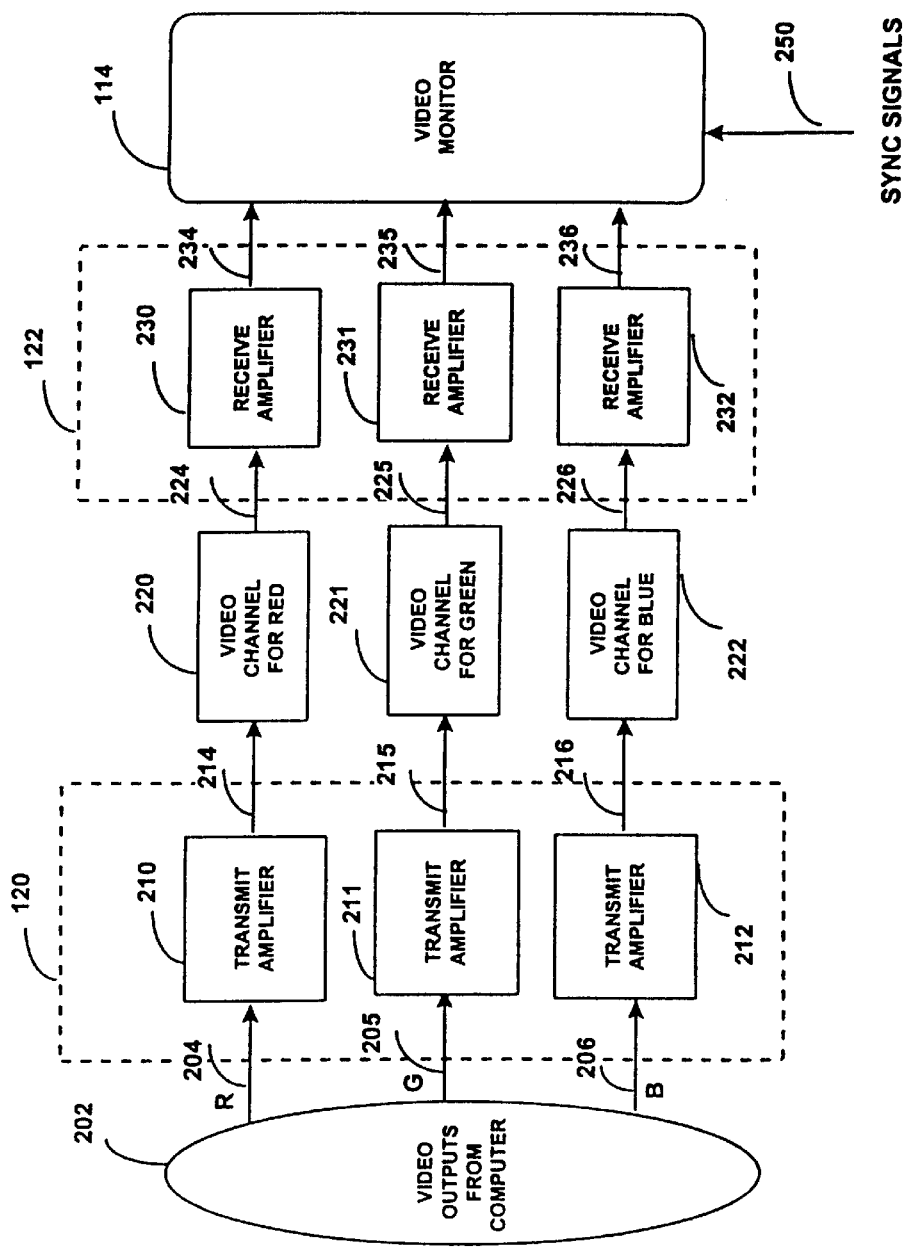
FIG. 2 illustrates end-to-end connections for transferring video signals in an extension system in accordance with the present invention.
Figure 6:
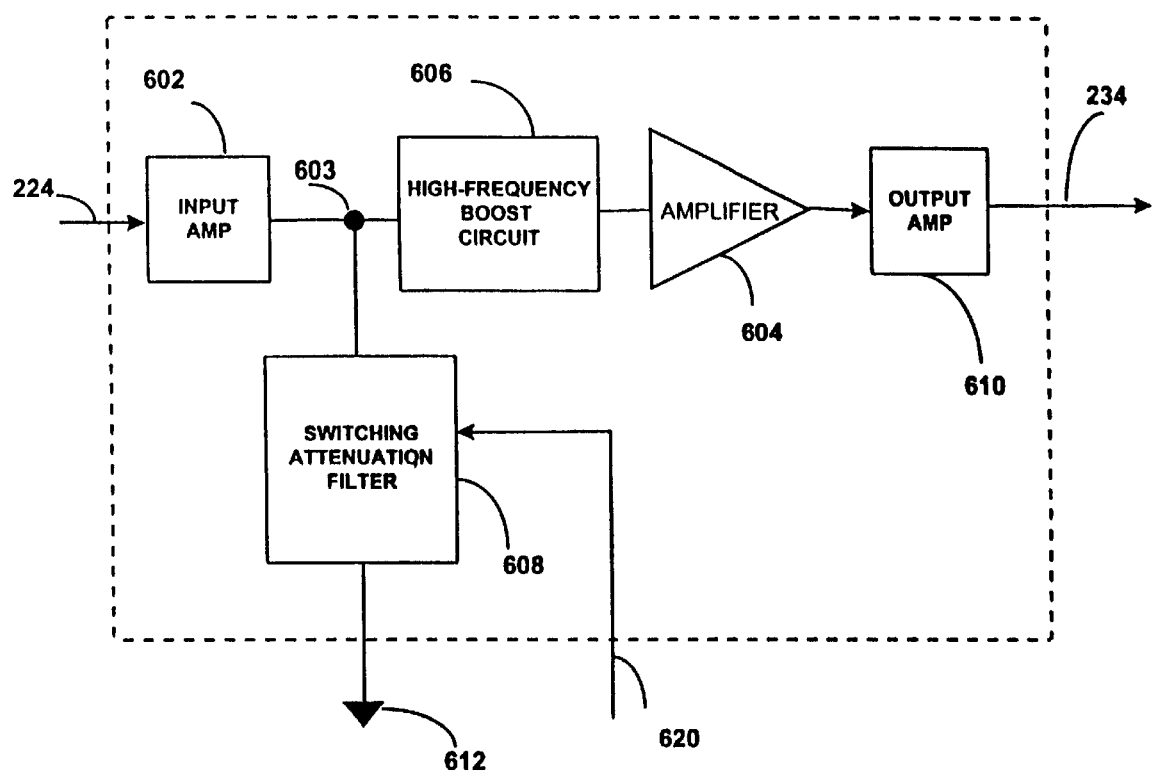
FIG. 6 illustrates elements of an adaptive receiver in accordance with the present invention.

FIG. 2 illustrates the components of a video transmission system 200 in accordance with the present invention. Video signals are developed in the video output circuits 202 of the computer 110. A red video signal 204, a green video signal 205 and blue video signal 206 are input signals to video buffer 120. Each of the three video signals is amplified by corresponding transmit amplifiers 210, 211, and 212. The outputs of the transmit amplifiers are referred to as the red transmit signal 214, green transmit signal 215, and blue transmit signal 216. These transmit signals have both amplification and high-frequency boost as will be seen below. The video channels 220, 221, and 222 are unshielded twisted pairs from a Category 5 cable. Other types of cables such as shield twisted pairs, coaxial cables, and other cables could be used in accordance with the present invention. The output of the video channels are impaired video signals 224, 225, and 226. These impaired video signals are amplified and shaped by receive amplifiers 230, 231 and 232. The receive amplifiers may have amplification, amplification and filtering, amplification and selectable filters, or may have adaptive filters. Adaptive filters that automatically improve video performance are illustrated in FIG. 6 and are discussed below. The output of the receive amplifiers is coupled to the video monitor 114 as monitor video signals 234, 235, and 236. In order to complete the set of signals required for a monitor display, sync signals are coupled from the slave T/R 102.

Figure 3:
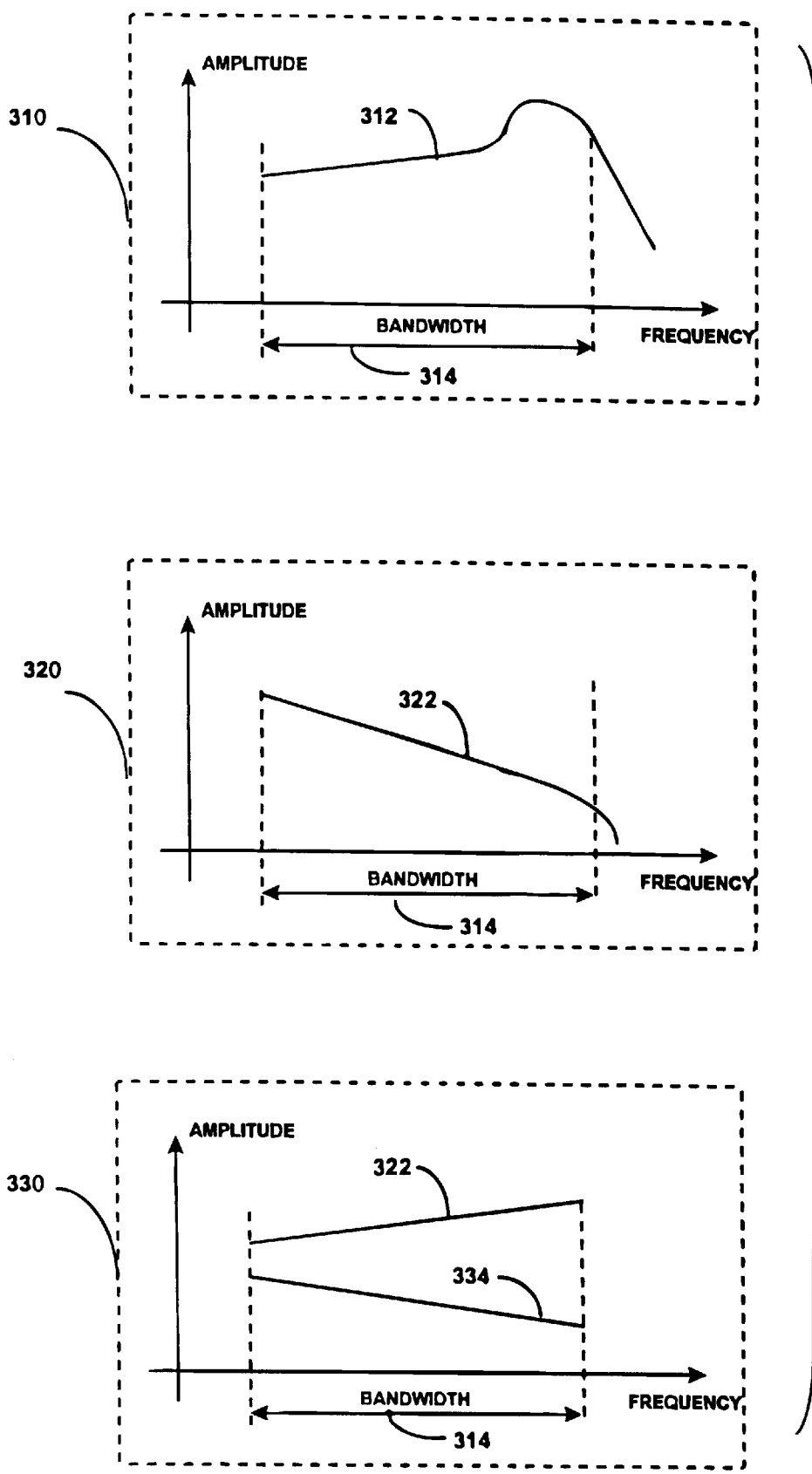
FIG. 3 illustrates the frequency characteristics of a video elements between the computer and the video monitor in an extension system.

The frequency characteristics of video elements between the computer 110 and the video monitor 114 are illustrated in FIG. 3. The frequency response shapes shown in these figures are approximations of characteristics and given to show the need for an adaptive equalizer. The transmit amplifier boost characteristics 310 are illustrated by boost curve 312 over the bandwidth of interest 314. The frequency characteristics of a video channel 320, such as an unshielded twisted pair varies as a function of the length of the twisted pair. As shown in channel characteristics 320 the channel curve 322 represent amplitude attenuation as a function of frequency per unit length over the desired bandwidth 314. Hence if a cable is doubled in length the slope of the curve will be twice that of the original cable. Amplitude and gain characteristics for a receive amplifier are shown in amplifier characteristics illustration 330. In order to equalize for a long pair of wires high gain curve 332 would be required and for a short pair of wires low gain curve 334 would be used. The approximate shapes shown in FIG. 3 can be determined frequency response measurements. The shape of the boost curve 312, also referred to as a high-frequency boost, is typically selected by the circuit designer after considering the output frequency contents of the computer video signals and the characteristics of the cables that may be used as the communication channel. The channel characteristic curve 322 may typically be found in manufacturers' specifications. For example, a Category 5 cable used in the present invention has frequency response characteristics available from the Belden Wire and Cable Company of Richmond, Ind.

Figures 4, 5:
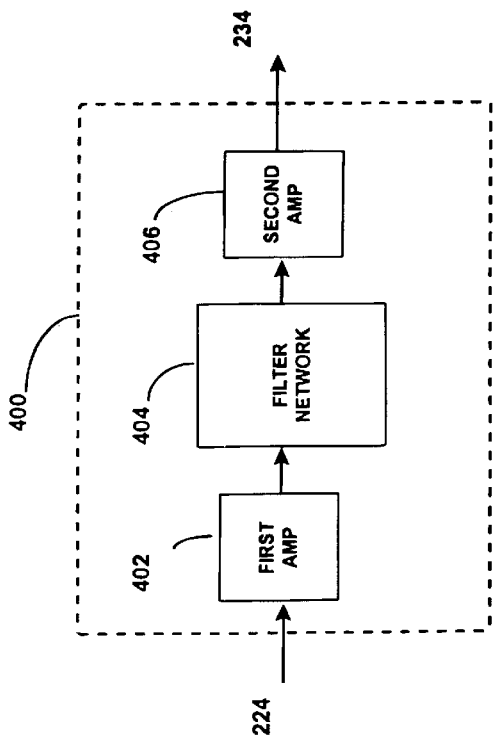
FIG. 4 illustrates a prior art receiver circuit.
FIG. 5 illustrates the timing sequences for transferring packets between a master T/R and a slave T/R in accordance with the present invention.

A prior art receive circuit 400 is shown in FIG. 4. When the impaired video signal 224 is received a first amplifier 402 raises the voltage level of the impaired signal. A filter 404 having fixed elements approximates the inverse frequency characteristics of the video channel. The filter may be designed for a fixed length of a specific wire or be manually adjusted by using jumper straps. The output of the filter is then amplified by a second amplifier 406 and then becomes an receiver output signal 234. The output signal is then coupled to the video monitor 114. The receive circuit 400 performs well with one fixed filter when all the transmission wires are approximately the same length and have the same transmission characteristics per unit length. Although adjusting the filters for different lengths of transmission wires provides satisfactory video performance, the adjusting does require manually changing components using the jumper straps.

In order to automatically change filter characteristics for pairs of wires of different lengths, a means for automatically measuring the length of the wires is required. FIG. 5 illustrates the packet protocol for transferring peripheral information between the computer and peripheral devices 112 in accordance with the present invention. The packet protocol, designed for transferring peripheral information, is used to measure the round-trip time between the computer and the peripheral site. The time to travel one way is the delay time and is half of the round-trip time. A number representing the delay time is used as the input to an adaptive filter. Details of the content of the packets is described in an earlier application by the inventor, but is not needed in order to understand the time measurement method.

Still referring to FIG. 5, a first packet, transmit packet N 502, is sent from the computer in the downstream direction. When the packet is sent a first counter, at the master R/T 101 is started at a count value of zero. The transmit packet N 502 arrives at the peripheral site as a received packet N 504. A second counter, located at the peripheral site is set at a count value of 32 when the received packet N 504 arrives. When the second counter reaches a count value of 64 a second packet, transmit packet N+1 506 is sent in the upstream direction. When the second packet arrives at the computer as received packet N+1 508, the counter value of the first counter is stored. The stored counter value minus 32 is equal to a number proportional to twice the length of the twisted pair of wires of the peripheral channel. In the present embodiment a count value represents a cable length of about 14 feet. Count values change at 41.67 nanosecond intervals. The count proportional to twice the cable length is stored as a number. The video channel pairs of twisted wires are typically in the same binder as the pair of wires of peripheral channel and therefore have the same length. Although the length measurement method as described is implemented at the computer, the automatic measurement of length could also occur at the peripheral site. When the length measurement occurs at the peripheral site, the number representing twice the length is available for activating switches in an adaptive receive amplifier. Alternative methods of measuring the length of a cable could be used to automatically generate the number representing the delay time. For example the alternative method of measuring a voltage at the second site when a reference voltage is applied at the first site. Other methods of automatically measuring the length of a cable are known to those persons skilled in the art.

FIG. 6 illustrates an adaptive receive amplifier 600 in accordance with the present invention. Three of the adaptive receive amplifiers 600 are replacements for the three video receive amplifiers 230, 231, and 232. To illustrate the functionality of the embodiment illustrated in FIG. 6 the red video signals are chosen as input and outputs. The impaired red video signal 224 is amplified by input amplifier 602 and appears at node 603. The signal at the node 603 is attenuated by the switching attenuation filter 608. The attenuated signal receives a high-frequency boost by high-frequency boost circuit 606. The boosted signal is then amplified by amplifier 604 and output amplifier 610. The output of the output amplifier is the monitor video signal 234.. The switcheing attenuation filter 608 comprises an arrangement of resistors and capacitors. In one embodiment six parallel networks are connected to six switches. Each of the parallel networks comprises a resistor and capacitor in series. When a switch of the six switches is closed one end of the series resistor and capacitor is connected to the input node 603 and the other end is connected to ground 612. By closing the switches in a predetermined sequence in response to the number representing the delay time of the video channel, a variety of filter characteristics is obtained. The combination of the high-frequency boost circuit 606 and the switching attenuation filter 608 serve as an adaptive equalizer and cancel for the most part the impairments caused by the video channel for red 220. It is understood by those skilled in the art that a wide variations in the filter design as described in FIG. 6 could provide equivalent results. In addition an adaptive equalizer could be placed at the computer site and designed in the manner described above. When the length of the pairs of wires or cables is known using the measurement method or an equivalent measurement method, then a variety adaptive receivers structures could be used to cancel the impairments of the video channel.

Figure 7:
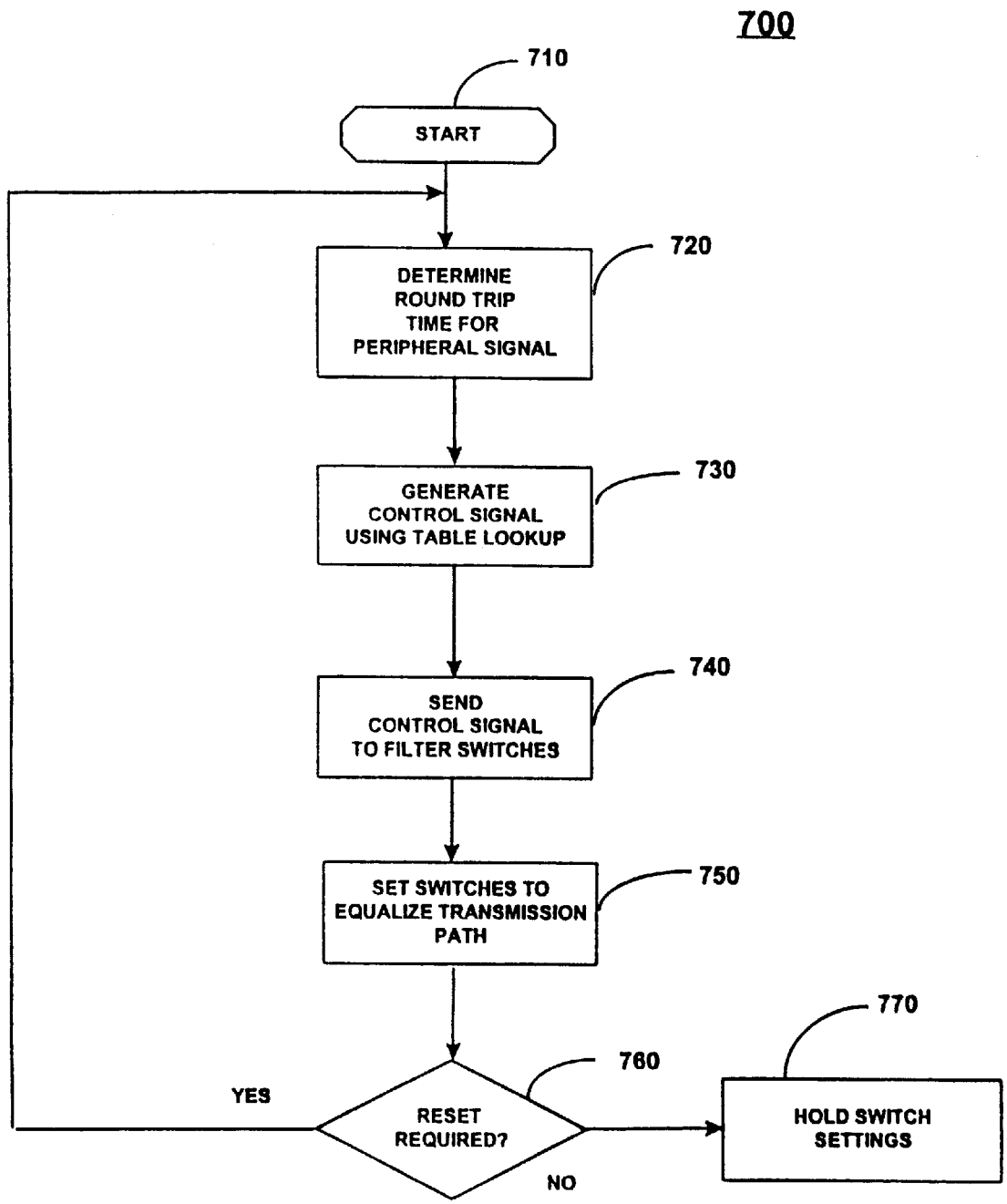
FIG. 7 is a method for equalizing a video signal transmitted from a computer over a video communication channel in accordance with the present invention.

The method of automatically and adaptively equalizing the video channel impairments is shown in FIG. 7. When the pairs of wires coupling the computer site to the peripheral site are connected the method starts, step 710. The round trip time is determined by timing peripheral packets, step 720. The number representing the round trip time uses a table lookup to generate a switch control signal, step 730. The control signal is sent to the filter switches, step 740 and switches are set to equalize the transmission path, step 750. If it is necessary to reset the switches a return path to step 720 occurs, the YES path of step 760. The NO path of step 760 results in holding the switch settings, step 770.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

What is claimed is:

1. In an extension system having a computer at one site and peripherals and a video monitor at a second site, an adaptive video receiver at the second site for removing video frequency distortion from a video signal, the adaptive video receiver comprising:

a time measurement system for determining the delay time between the computer and the adaptive receiver; and an equalizer for receiving the video signal, the equalizer having a plurality of selectable frequency characteristics where the frequency characteristics are selected by the value of the delay time and provide a frequency characteristic which is the inverse of video frequency distortion, thereby providing an undistorted video signal to the video monitor.

2. The adaptive video receiver of claim 1 wherein the equalizer comprises a switching attenuation filter operating cooperatively with a high-frequency boost circuit, where the switching attenuation filter has switches responsive to the value of the delay time.

3. The adaptive video receiver of claim 1 wherein the video signal is amplified before being received by the equalizer.

4. The adaptive video receiver of claim 1 wherein the video signal was shaped by a transmitter filter at the first site.

5. The adaptive video receiver of claim 1 wherein the time measurement system measures the round-trip time delay by observing peripheral information packets.

6. In an extension system having a computer at one site and peripherals and a video monitor at a second site, an adaptive video transmitter at the first site for removing video frequency distortion from a video signal, the adaptive video transmitter comprising:

a time measurement system for determining the delay time between the computer and the adaptive receiver; and an equalizer at the transmitter for shaping the transmitted video signal, the equalizer having a plurality of selectable frequency characteristics where the frequency characteristics are the inverse of the video channel and the selected frequency characteristic is dependent of the time delay, the combination of the equalizer and the channel thereby providing an undistorted video signal to the video monitor.

7. The adaptive video transmitter of claim 6 wherein the time measurement system measures the round-trip time delay by observing peripheral information packets.

8. In an extension system having a computer at one site and peripherals and a video monitor at a second site, a method for removing video frequency distortion from a video signal, the method comprising:

measuring the time delay between the first site and the second site;

selecting, dependent on time delay, an equalizer frequency characteristic;

filtering the video signal using the selected equalizer frequency characteric; and coupling the filtered video signal to the video monitor.

9. In an extension system having a computer at first site and peripherals and a video monitor at a second site, three adaptive video receivers at the second site for removing video frequency distortion from three respective video signals, each of the adaptive video receivers comprising:

a time measurement system for determining the delay time of signals transmitted between the first site and the second site; and an equalizer for receiving the respective video signal, the equalizer having a plurality of selectable frequency characteristics where the frequency characteristics are selected by the value of the delay time, thereby providing a frequency characteristic which is the inverse of video frequency distortion, thereby providing an undistorted video signal to the video monitor.

10. In an extension system for connecting a computer at a first site to peripherals at a second site where the extension system has a peripheral channel and one or more video channels, an adaptive equalizer for removing frequency distortion from either type of channel, the equalizer comprising:

a time measurement circuit for determining the length of the peripheral channel; and a switching system for selecting and connecting predetermined filters in cascade with either type of channel, thereby removing the frequency distortion of the channel.

11. In an extension system having a computer at one site and peripherals and a video monitor at a second site, an adaptive video receiver at the second site for removing video frequency distortion from a video signal, the adaptive video receiver comprising:

a means for measuring the distance between the first site and the second site; and an equalizer for receiving the video signal, the equalizer having a plurality of selectable frequency characteristics where the frequency characteristics are selected by the value of the distance and provide a frequency characteristic which is the inverse of video frequency distortion, thereby providing an undistorted video signal to the video monitor.

\* \* \* \* \*